United States Patent [19]

Depauw et al.

[11] Patent Number: 5,110,662
[45] Date of Patent: May 5, 1992

[54] COATED GLAZING MATERIAL

[75] Inventors: Jean-Michel Depauw, Brussels; Jean-Claude Hoyois, Ham-sur-Heure, both of Belgium

[73] Assignee: Glaverbel, Brussels, Belgium

[21] Appl. No.: 458,386

[22] Filed: Dec. 28, 1989

[30] Foreign Application Priority Data

Jan. 5, 1989 [GB] United Kingdom ............... 8900166

[51] Int. Cl.$^5$ .................... B32B 15/04; B32B 7/12
[52] U.S. Cl. ........................... 428/192; 204/192.26; 204/192.27; 427/271; 428/209; 428/216; 428/336; 428/337; 428/343; 428/469
[58] Field of Search ............... 428/469, 216, 336, 337, 428/192, 209, 343; 427/271; 204/192.27, 192.26

[56] References Cited

U.S. PATENT DOCUMENTS 4,428,810 1/1984 Webb et al.
4,790,922 12/1988 Huffer ............................ 204/192.27

FOREIGN PATENT DOCUMENTS 0104870 4/1984 European Pat. Off.
0183052 6/1986 European Pat. Off.
0219273 4/1987 European Pat. Off.
0226993 7/1987 European Pat. Off.
0275474 7/1988 European Pat. Off.
0304234 8/1988 European Pat. Off.

Primary Examiner—Thomas J. Herbert, Jr.
Attorney, Agent, or Firm—Spencer, Frank & Schneider

[57] ABSTRACT

A substrate of glazing material carries a multi-layer coating which comprises a reflective layer of silver sandwiched between a transparent undercoat and a transparent overcoat. The undercoat for the silver layer comprises at least one layer of a metal oxide selected from tin oxide, titanium dioxide, aluminium oxide, bismuth oxide and a mixture of two or more thereof, over which is deposited a layer of zinc oxide having a thickness not greater than 15 nm. The overcoat for the silver layer comprises a layer of an oxide of a sacrificial metal selected from the group consisting of titanium, aluminium, stainless steel, bismuth, tin and mixtures of two or more thereof, which is formed by initial deposition of the sacrificial metal and its conversion to oxide. For forming a low emissivity coating with good light transmission, the silver layer is 8 to 12 nm thick. A specific multi-layer low emissivity coating is formed by depositing the following layers, starting from the substrate surface:

Undercoat
  3 nm titanium dioxide
  20 nm tin oxide (SnO2)
  13 nm zinc oxide
Reflective layer
  10 nm silver
Overcoat
  3.5 nm titanium for conversion to titanium dioxide
  22 nm tin oxide
  12 nm titanium dioxide.

15 Claims, No Drawings

COATED GLAZING MATERIAL

CROSS-REFERENCE TO RELATED APPLICATION

The subject matter of this Application is closely related to applicants' copending application Ser. No. 07/458,385 filed Dec. 28, 1989.

BACKGROUND OF THE INVENTION

1. Field of the Invention

The invention relates to coating glazing material. In particular it relates to a coating which comprises several layers of material deposited in a defined and advantageous sequence upon the glazing.

The expression "glazing material" is used herein to denote sheets of plastics or vitreous material which are used in the performance of the glazier's art. "Vitreous material" includes glass and vitrocrystalline material. Such sheets are most often transparent and clear, but they may be coloured and/or they may be merely translucent or even opaque. As an example of an opaque glazing panel may be cited a panel for mounting beneath a transparent panel, for example in an interior partition, where it is desired to reproduce the texture of the upper transparent panel without allowing sight through such lower panel.

2. Description of the Related Art

The wide variety of uses for glazing sheets and panels has led to a considerable breadth of knowledge on coating the glazing so as to improve particular qualities. Coatings may for example be provided to protect the glazing surface, to colour the glazing or to create an electrically conducting layer across it.

In recent years considerable research effort has been put into the selection of multi-layer coatings which impart low emissivity and/or other optical or energy transmitting or reflecting properties to glazing panels for use in vehicles and buildings.

One aim has been to reduce heat loss from within the space enclosed by the panel, while neither preventing the admission of solar heat nor hindering a high level of light transmission in both directions. One previously proposed way of achieving this has been to provide low emissivity qualities by employing a coating made up of several thin layers of materials which complement each other to achieve the desired result.

Most of the required optical features can in principle be provided by a single coating of reflective metal, for example silver, applied as a layer sufficiently thin to permit transmission of most of the radiation in the visible portion of the spectrum while reflecting most of the infra red portion. If used alone however such a thin metal layer tarnishes in the atmosphere, giving discolouration, reduction of light transmission and a tendency to fragment. It is also of limited mechanical strength and thus prone to chipping, especially at the edge of the glazing panel, and to abrasion.

Other layers are therefore applied in combination with the reflective layer so as to protect it physically against abrasion and chemically against corrosion. These further layers must moreover be selected from materials which do not significantly weaken the optical properties of the coated glazing. The layers immediately adjacent the reflective layer are most commonly of metal oxides, sometimes in combination with other materials such as varnishes, plastic laminates or further sheets of glazing. Such adjacent layers are employed in some instances to improve the optical qualities by acting as a non-reflective layer for the visible portion of the spectrum.

One of the most commonly used coating materials is tin oxide, typically applied as a layer on both sides of the reflective metal layer. This provides many of the required qualities and is also generally inexpensive. It has good optical properties especially as a non-reflective layer (if applied to an appropriate thickness) and also binds well to the adjacent layers. It has been used both under the reflective metal and above it. There have also been several prior proposals to add to the tin oxide, or replace part of it, with a further metal or metal oxide to maintain particular chemical, physical or optical qualities of the coating as a whole. The choice of added materials, and the sequence in which they are applied to the glazing, is however a complex matter since there is a tendency for a material selected to improve one quality but to diminish one or more of the others. This may in turn call for a further layer to correct the adverse effect on such other qualities.

A typical example of the complex layer structure that results is described and claimed in European patent specification EP-A-226993. This discloses a high transmittance low emissivity coating on a glass substrate which includes an oxide reaction product of an alloy containing zinc and tin as a first transparent anti-reflective film, copper as a primer film deposited on the first film, silver as a transparent infrared-reflective film deposited on the primer, an oxide reaction product of an alloy containing zinc and tin as a second transparent anti-reflective film deposited on the silver and titanium dioxide as a protective overcoat.

Similar coatings are described in European patent specification EP-A-104870 which discloses in example 1 a float glass pane coated in turn with a tin oxide layer, a silver layer, a copper layer and a further layer of tin oxide. Each of the tin oxide layers is 30–50 nm thick, the silver layer 8 to 12 nm and the copper layer just 1 to 5 nm.

European patent specification EP-A-275474 describes and claims a high transmittance, low emissivity heatable article comprising a transparent nonmetallic substrate, a first transparent anti-reflective metal oxide film comprising zinc deposited on a surface of said substrate, a transparent infrared reflective metallic film deposited on said anti-reflective metal oxide layer, a metal-containing primer layer deposited on said infrared reflective metallic film, wherein said metal is selected from the group consisting of titanium, zirconium, chromium, zinc tin alloy and mixtures thereof, and a second transparent anti-reflective metal oxide film comprising zinc deposited on said metal-containing primer film.

A proven technique for applying such layers is cathodic sputtering. This is conducted at very low pressures, typically of the order of 0.3 Pa, to give a layer of the coating material across the glazing surface. It can be conducted under inert conditions, for example in the presence of argon, but alternatively can be effected as reactive sputtering in the presence of a reactive gas such as oxygen.

European patent specification EP-A-183052 describes the use of reactive sputtering of a cathode target of an alloy of zinc and tin in an oxygen atmosphere so as to apply to a substrate of glazing material an oxide reaction product of the alloy.

European patent specification EP-A-219273, which is largely concerned with an electrically conductive coating for motor vehicle windows, describes a coating process (and the product thereof) in which a dereflecting layer such as zinc oxide is first deposited, followed by a transparent silver layer, a sacrificial metal layer (for example of titanium), a layer of titanium dioxide and a second dereflecting layer. In this process both the dereflecting layers are deposited by reactive sputtering.

SUMMARY OF THE INVENTION

The present invention is directed towards the problem of providing a combination of protective layers for a glazing sheet with a silver reflective layer so as not only to protect the silver against corrosion, but to do so without entailing an adverse effect on the optical properties of the glazing as conferred on it by the properties of the glazing material itself and the silver layer.

According to the invention there is provided a substrate of glazing material carrying a multi-layer coating which comprises a reflective layer of silver sandwiched between a transparent undercoat and a transparent overcoat, characterised in that the undercoat for the silver layer comprises at least one layer of a metal oxide selected from tin oxide, titanium dioxide, aluminium oxide, bismuth oxide and a mixture of two or more thereof, over which is deposited a layer of zinc oxide having a thickness not greater than 15 nm, and in that the overcoat for the silver layer comprises a layer of an oxide of a sacrificial metal selected from the group consisting of titanium, aluminium, stainless steel, bismuth, tin and mixtures of two or more thereof, and formed by initial deposition of the sacrificial metal and its conversion to oxide.

The invention also provides a process of depositing a multi-layer coating on a substrate of glazing material which coating comprises a reflective layer of silver sandwiched between a transparent undercoat and a transparent overcoat, characterised in that the undercoat for the silver layer is formed by depositing in sequence at least one layer of a metal oxide selected from tin oxide, titanium dioxide, aluminium oxide, bismuth oxide and a mixture of two or more thereof, and a layer of zinc oxide having a thickness not greater than 15 nm, and in that the overcoat for the silver layer is formed by depositing a layer of a sacrificial metal selected from the group consisting of titanium, aluminium, stainless steel, bismuth, tin and mixtures of two or more thereof, and converting the metal to oxide.

The specific combination of metal oxide and metal layers as defined in the present invention offers several important advantages over prior proposals. Thus it provides a coated substrate of glazing material having the desired optical properties which can be left substantially unaffected in an adverse manner by the application of a said undercoat and overcoat of appropriate thicknesses, as will be adverted to later in this specification. It further provides a significant improvement in the resistance to corrosion of the silver layer not only through the process of manufacturing the coated substrate but also throughout the life of the coated product. A uniform quality of product is obtained, both in terms of uniformity of coating across the whole area of the substrate, even for large substrates (for example measuring up to 6 meters in length), and in terms of consistency of product quality over a long production run.

The process of applying the coating is readily conducted and can be reliably reproduced, again through a long production run if required.

The reasons for the improvements are not fully understood but it does seem that the presence of a single thin layer of zinc oxide immediately beneath the silver layer is of especial importance. It is most unexpected that protection of the reflective metal layer can be effected by a material placed beneath it, since previously the expectation was that an upper layer was required to improve protection, the underside protection being ensured by the glazing. Additionally the coating avoids the use of materials such as copper which have poor light transmission properties.

The benefits of the invention are particularly marked in the case of low emissivity glazing panels for buildings, which are often employed with a second panel to form a double glazing unit. The invention can however also be applied to anti-solar panels, to automobile windows and to mirrors. The main difference in the coatings for these different uses lies in the thickness of the silver layer. Typical thicknesses of silver for anti-solar panels lie in the range 24 to 28 nm. Mirrors typically have silver layers with a thickness in excess of 40 nm, and for low emissivity coatings, silver layer thicknesses are usually in the range 8 to 12 nm. In the case of automobile windows, the use of a sacrificial metal also helps in protecting the silver layer through any subsequent heat treatment, for example a tempering or bending step to which a vitreous glazing sheet might be subjected.

It is envisaged that the widest use of the present invention will be in conjunction with transparent substrates, and glass is the preferred glazing material.

The preferred deposition technique for the purposes of the invention is magnetically enhanced sputtering. This is not only quick and convenient in use but also gives excellent physical qualities to the deposited layers in terms of uniformity of thickness, cohesion within the layer and adhesion to adjacent layers. A cathode of each of the required metals, to be applied as such or to form a metal oxide, is activated at the required stage of the deposition. One particularly convenient form of cathode is a rotary unit comprising a rotating hollow cylinder cooled internally by a coolant fluid such as water. A multi-cathode sputtering chamber is generally preferred so as to facilitate the application of different combinations of metals and metal oxides.

The order in which the respective metals and metal oxides are deposited may be controlled by the direction of movement of the substrate of glazing material past the cathodes when a plurality of cathodes is used.

Depositing several layers in a single pass is advantageous in giving full use of the sputtering apparatus and rapid build up of the required coating. The simultaneous depositing of a mixture of metals or metal oxides may be similarly effected in a single pass, but in this case the source can either be two or more different metal cathodes simultaneously activated or be a single cathode comprising an alloy of the required metals.

The silver and the sacrificial metal layers should each be deposited in an inert atmosphere, for example of argon. The other layers can either be produced by depositing oxide as such or, and more preferably, by reactive sputtering of the respective metal in an oxygen-containing atmosphere. The working pressure for the sputtering is preferably in the range 0.15 to 0.70 Pa.

In the sputtering of metal in an oxygen-containing atmosphere the oxide product is not necessarily obtained in the fully oxidised state. At least part of the product may be present as a sub-oxide or even in the metallic state. Subsequent depositions in a reactive atmosphere and any subsequent heat treatment of the coated panel do however tend to complete the oxidation of any residual metal or sub-oxides formed in the earlier deposition.

In most embodiments of the invention it is preferred that said overcoat includes at least one further layer of a metal oxide selected from tin oxide, titanium dioxide, aluminium oxide, bismuth oxide and a mixture of two or more thereof, the said further layer or layers being deposited after said layer of an oxide of a sacrificial metal. This further layer is primarily of benefit in improving optical qualities such as reflective tint and reduced luminous reflection but it is also helpful in adding to the barrier properties of the sacrificial metal so as to prevent oxygen from reaching the silver. The further layer or layers are preferably selected from tin oxide and titanium dioxide.

In the case of the sacrificial metal, which serves the purpose of protecting the silver layer against oxidation, this is converted to oxide during any subsequent exposure to an oxidising atmosphere. This is usually mostly effected during subsequent deposition of metal oxide, but also occurs during any subsequent heat treatment or during prolonged storage. If the silver is not so protected, the coated substrate of glazing material loses its low emissivity and its light transmission is dramatically reduced. The preferred sacrificial metal is titanium, which has the advantages of being easily oxidised and of forming an oxide of very low absorbency. We have discovered that the use of titanium as sacrificial metal gives a very effective barrier against oxidation of the silver.

In some preferred embodiments of the invention, said undercoat comprises a first layer of titanium dioxide overcoated by a first layer of tin oxide in turn overcoated by a layer of zinc oxide having a thickness not greater than 15 nm, and said overcoat comprises a layer of titanium dioxide formed by initial deposition of titanium metal and its conversion to oxide, a further layer of tin oxide, and a further layer of titanium dioxide. This preferred configuration can be conveniently achieved in a multi-cathode sputtering chamber in which one cathode provides the source of titanium dioxide and another provides the source of tin oxide.

The layer sequence in this preferred embodiment is, starting from the substrate:

Undercoat
  a first layer of titanium dioxide,
  a first layer of tin oxide,
  a layer of zinc oxide (having a thickness not greater than 15 nm)
Reflective layer
  a layer of silver
Overcoat
  a layer of titanium dioxide, formed by initial deposition of titanium metal and its conversion to oxide,
  a further layer of tin oxide, and
  a further layer of titanium dioxide.

Each of the materials used in the coating has optical, chemical and physical properties which contribute to the properties of the coating as a whole. Collectively the properties may include not only the low emissivity and high light transfer (in the case of a transparent panel having a silver layer 8 to 12 nm thick) but also chemical resistance to corrosion, at both ambient and elevated temperatures and over prolonged periods. The physical properties include good adhesion to the substrate and to each other and good resistance to wear, for example against chipping or flaking.

Optically each of the metal oxide layers permits good transmission of light and heat radiation and the metal layers reflect heat radiation.

Chemically the need is to protect the silver against oxidation. This is achieved partly by encasing the silver within metal or metal oxide layers that reduce or eliminate access of oxygen and partly by including materials having greater reactivity than silver has for oxygen. It is further believed that in the present invention the zinc oxide imparts a degree of passivity to the silver thereby rendering it less vulnerable to oxygen attack.

In such preferred embodiment the properties contributed by each successive layer may include the following, depending at least in part on the thickness of the individual coating layers:

The first titanium dioxide layer has good light transmission properties, is chemically inert and physically provides a strong bond between the substrate and the first tin oxide layer. The first tin oxide layer provides good light transmission. The zinc oxide layer also has good properties of light transmission but is primarily included because of its beneficial effects in protecting the silver layer against corrosion.

The silver layer is included because of its ability to reflect heat radiation while permitting light transmission.

The titanium initially deposited on the silver is a protective barrier for the silver and reacts with any oxygen that comes into contact with it.

The further layer of tin oxide has good properties of light transmission and also serves as a barrier to ingress of oxygen into the layers beneath it.

The further layer of titanium dioxide is primarily present as a wear-resistant coating.

In its broader aspect in which a single metal oxide layer is employed between the substrate and the zinc oxide and as the coating on the titanium, the said single layers fulfil the combined duties of respectively the first titanium dioxide and tin oxide layers and the further tin and titanium dioxide layers.

Although its beneficial effects relative to the silver make the presence of the zinc oxide layer an essential feature of this invention, other properties of the zinc oxide necessitate that its total quantity is kept as low as possible. Compared with tin oxide, zinc oxide is less chemically resistant and more prone to weathering. Thus it is known that a coating which includes a layer of zinc oxide cannot generally be used for the external surface of a substrate of glazing material, even if an opacifying layer is placed on top of the zinc oxide, because these layers are not resistant to atmospheric conditions. Similar problems arise with a mixture of zinc oxide and tin oxide. Such layers generally have utility only in use in the internal surface of a sealed double glazing panel. If a glazing panel is to be laminated with PVB, the presence of zinc oxide gives problems with the adhesive employed to bond the laminate, such that separation of the different layers will occur unless an additional and compatible bonding layer, for example of chromic oxide, is interposed.

Zinc oxide is also unsuitable for use at the borders of a window pane to which adhesives are to be applied: it tends to react with the adhesive and should therefore be removed. There is a related problem in that the reflective metal layer tends not to adhere strongly to the adjacent layers and should also be removed before an adhesive is applied. Thus one embodiment of the invention is a coated substrate of glazing material in which a strip of adhesive is applied around the periphery of one face of the substrate and the coating according to the invention is applied to the remainder of the said face, thereby ensuring that the periphery has no zinc oxide layer. This configuration of coating and adhesive strip is most conveniently achieved by first depositing the coating layers according to the invention across the whole of one face of the substrate, then removing the coating layers from a peripheral marginal portion of the said face, and finally applying the adhesive strip to the marginal portion. Removal of the coating layers involves certain problems in that the zinc oxide, being relatively soft, tends to act like a soft lubricant, to stretch rather than break away and having been broken away to pollute the removal means. A robust physical method of removing the peripheral margin of the coatings is accordingly required, the use of an abrasive mill being particularly preferred.

Such adhesive-bordered panels may be employed in double glazing units. The provision of an effective adhesive is important here to ensure a longlasting hermetically sealed space between the two panels, and again the marginal portion should be removed before application of the adhesive strip.

Most importantly in terms of the present invention although the zinc oxide is deposited in an amorphous form it has a tendency to undergo crystalline growth, for example in a direction perpendicular to the glazing, and thereby to create a relatively bulky layer from a given weight of material. This leads to a weaker physical strength within the layer and is probably a reason for the reduced chemical resistance discussed above.

One possible reason for the effectiveness of the single deposited layer of zinc oxide according to the invention is that because of its different structure the zinc oxide tends to migrate through the adjacent layers.

Accordingly the invention requires that in selecting the thickness of the zinc oxide layer a balance is struck between the minimum quantity required to give good protection to the silver and the maximum quantity to avoid introducing physical weakness and chemical reactivity into the coating. As defined above, the maximum permissible thickness is 15 nm and in general the preferred thickness is in the range 5 to 13 nm, most preferably 10 to 13 nm.

For the purpose of providing a low emissivity, high light transmission panel, the thickness of the silver layer should also preferably lie within the narrow limits of 8 nm to 12 nm. Below this range the degree of infra red reflection is generally insufficient and above it the silver imposes too great a barrier to light transmission. Within the defined limits the invention reliably and reproducibly permits the achievement of emissivity below 0.1, as is preferred.

With regard to the thickness of the other layers these must be chosen relative to the thickness of silver and zinc oxide layers and relative to each other so as to determine the combined optical path (the product of thickness and refractive index for each layer) which gives the desired optical appearance to the coated substrate. For a low emissivity coating the requirement is for a coating with as neutral a reflective tint as possible, but with a bluish appearance in preference to any other colour. Moreover a weak luminous reflection is sought in order to obtain a high luminous transmission. In general these required optical properties will be obtained within a total thickness of 30 to 45 nm on either side of the silver layer, but it is to be understood that because of the different refractive indices of certain of the different materials, reducing the thickness of one layer may require adjustment of the thickness of one or more other layers to restore the optical requirements.

The sacrificial metal layer is preferably of a thickness in the range 2 to 15 nm, and in some embodiments, it is preferably of a thickness in the range 2 to 4 nm. A balance has to be struck between including sufficient material to react with any oxygen which permeates into contact with it and to maintaining the required light transmission properties. In its metallic state this layer represents a barrier to good light transmission and thus requires a minimal thickness if the light transmission of the overall coating is to be within acceptable limits. The transmission properties of this metal layer do however improve when it is oxidised. This occurs during deposition of subsequent layers and also during any heat treatment step, such as a bending treatment and/or a tempering treatment for the substrate. Thicker layers, e.g. 5 to 15 nm are recommended if such a later heat treatment is to be undergone. Desirably all of the sacrificial metal is oxidised thereby producing a layer of non-reflective, light transmitting metal oxide.

The relative proportions of tin oxide and titanium dioxide in the undercoat and overcoat are generally not critical. Practical convenience employing a multi-cathode sputtering apparatus may require that they are both deposited during a single pass of the substrate. It is however desirable in this case to keep the titanium dioxide layer relatively thin. In one advantageous embodiment of the invention, the tin oxide represents the greater part of each of the metal oxide layers. In this embodiment when employed for a low emissivity coating the thickness of tin oxide is preferably in the range 15 to 25 nm and the thickness of titanium dioxide in the range 2 to 14 nm.

For an anti-solar coating the first (i.e. undercoating) metal oxide layers are generally thinner and the further (i.e. overcoating) layers are generally thicker. A typical anti-solar coating according to the invention is formed by depositing the following layers:

Undercoat
    2.5 nm titanium dioxide
    15 nm tin oxide
    12.5 nm zinc oxide
Reflective layer
    26 nm silver
Overcoat
    2.5 nm titanium metal for conversion to titanium dioxide
    45 nm tin oxide
    10 nm titanium dioxide.

The titanium conversion to dioxide takes place during deposition of the further layers of the overcoat.

This coating on a 6 mm float substrate of glazing material has a solar factor of 31% on the coated side, a luminous transmission of 47% and an emissivity of about 0.02.

Use of a coating according to the invention for a mirror offers the advantage that the silver can be on the front surface of the mirror and serve directly as the reflective surface. Unlike traditional mirrors it need not be further protected by glazing and paint. Thus an opaque vitrocrystalling substrate could be used if desired.

Because titanium dioxide has a higher refractive index than tin oxide, in substituting a part of one by the other the thickness of titanium dioxide should be about 75% of the thickness of the tin oxide in order to give the equivalent optical properties.

Zinc oxide and tin oxide have substantially the same refractive index as each other and thus from an optical viewpoint are interchangeable with each other without any adjustment in layer thickness.

In one preferred embodiment the present invention provides a coated substrate of glazing material with an emissivity of less than 0.1 and a light transmission of 87% for coatings with a blue reflective tint. For example starting with a 4 mm float substrate of glazing material having an emissivity of 0.84 and light transmission of 89% a coating according to a preferred embodiment of the invention gave a coated substrate with an emissivity of 0.08, and light transmission of 87%. This represents a significant advance over the optical properties of coated substrate of glazing materials of the prior art.

DESCRIPTION OF THE PREFERRED EMBODIMENTS

The invention is described below by way of illustration only with reference to the following examples.

EXAMPLE I

A window glazing panel of 4 mm thick float glazing with an emissivity of 0.84 and light transmission of 89% was introduced into a processing chamber comprising five planar magnetron sputtering sources, having targets of respectively titanium, tin, zinc, titanium and silver, an entry- and an outlet-gas lock, a conveyor for the glazing, power sources, sputtering gas inlets and an evacuation outlet.

The pressure in the chamber was reduced to 0.15 Pa. The panel was transported past the sputtering sources with the first titanium, tin and zinc sources activated and cold sputtered by oxygen gas at an effective depositing pressure of 0.2 Pa to give a titanium dioxide layer followed by a tin oxide layer and zinc oxide layer on the substrate. The oxygen was then evacuated and the substrated moved back past the sputtering sources with the silver and second titanium sources activated but this time with argon as the sputtering gas, to add a silver layer and a titanium layer, and the tin and first titanium sources activated, with oxygen as the sputtering gas, to give further layers of tin oxide and titanium dioxide. The resulting coating had the following composition, from the glazing surface:

Undercoat
 3 nm titanium dioxide
 20 nm tin oxide ($SnO_2$)
 13 nm zinc oxide
Reflective layer
 10 nm silver
Overcoat
 3.5 nm titanium for conversion to titanium dioxide
 22 nm tin oxide
 12 nm titanium dioxide.

The coated glazing had an emissivity of 0.08, a neutral reflective tint tending to blue and light transmission of 87%.

The sacrifical layer of titanium became converted to titanium dioxide during deposition of the subsequent layers of the overcoat. The silver layer had a resistivity of about 8 ohms per square. If it is desired to reduce the resistivity to about 4 ohms per square, this can readily be done by increasing the thickness of that layer to 12 nm. Either such panel may be formed into a resistance heating panel by depositing bus strips, for example of a conductive silver-containing enamel on top of the overcoat. Even though the tin and titanium oxide layers of the overcoat are not highly conductive, they are so thin that they do not significantly interfere with current distribution to the silver layer.

By way of comparison a coated sample as above and three samples prepared by a similar procedure and having the structures listed below, but in all three cases without the zinc oxide layer, were subjected to an accelerated weathering test. This comprised subjecting the samples to a temperature cycling each hour from 45° to 55° C. in an atmosphere of 99% relative humidity for three days. The three other samples were as follows:
 (1) glass: 36 nm tin oxide; 10 nm silver; 3.5 nm aluminium for conversion to oxide; 34 nm tin oxide.
 (2) glass: 3 nm titanium dioxide; 20 nm tin oxide; 10 nm titanium dioxide; 10 nm silver; 3.5 nm titanium for conversion to oxide; 22 nm tin oxide; 12 nm titanium dioxide.
 (3) glass: 3 nm titanium dioxide; 20 nm zinc oxide; 13 nm tin oxide; 10 nm silver; 3.5 nm titanium for conversion to oxide; 22 nm tin oxide; 12 nm titanium dioxide.

The sample according to the invention survived the test without any optical deterioration of the coating. The other samples had the following defects:
Sample 1
 several pinholes (1-2 mm) formed across the surface,
 a corrosion border of about 5 mm around the whole periphery,
 2 elongated stains of about 1 cm.
Sample 2
 several small pinholes (less than 1 mm) scattered across the surface
 4 stains of about 2 to 8 mm,
 1 fingerprint (in the form of corrosion of the layer),
 a corrosion border of about 1 to 2 mm around the whole periphery,
Sample 3
 several small pinholes of less than 1 mm and 1-2 mm,
 2 large stains of about 6-10 mm,
 1 fingerprint,
 a corrosion border of about 5 mm around the whole periphery.

EXAMPLE II

A glazing panel of 4 mm thick float glazing with an emissivity of 0.84 and light transmission of 89% was introduced into a processing chamber comprising five planar magnetron sputtering sources, having targets of respectively titanium, tin, zinc, titanium and silver, an entry- and an outlet-gas lock, a conveyor for the glazing, power sources, sputtering gas inlets and an evacuation outlet.

The pressure in the chamber was reduced to 0.15 Pa. The panel was transported past the sputtering sources with the first titanium, tin and zinc sources activated and cold sputtered by oxygen gas at an effective depositing pressure of 0.2 Pa to give a titanium dioxide layer followed by a tin oxide layer and zinc oxide layer on the substrate. The oxygen was then evacuated and the substrate moved back past the sputtering sources with the silver and second titanium sources activated but this time with argon as the sputtering gas, to add a silver layer and a titanium layer, and then the tin and first titanium sources were activated, with oxygen as the sputtering gas, to give further layers of tin oxide and titanium dioxide.

The resulting coating was formed by depositing layers of the following thickness and composition, from the glazing surface:

Undercoat
　3 nm titanium dioxide
　20 nm tin oxide ($SnO_2$)
　13 nm zinc oxide
Reflective layer
　12 nm silver
Overcoat
　10 nm titanium for conversion to titanium dioxide
　22 nm tin oxide
　12 nm titanium dioxide.

The sacrificial layer of titanium became partly converted to titanium dioxide during deposition of the overcoat of tin and titanium oxides, and oxidation of that sacrificial metal layer was completed when the coated glazing was subjected to a bending treatment after which the cooling schedule of the glazing was controlled so that it became thermally tempered, for service as a window for a motor vehicle. The silver layer had a resistivity of approximately 4 ohms per square. The silver layer was substantially unaffected by the bending and tempering treatment due to the increased thickness of the sacrificial metal layer as compared with the glazing of Example 1. The partially oxidised sacrifical metal layer also served to protect the silver layer during storage and transport prior to the bending and tempering treatment. The settings necessary to obtain these optical properties, in particular the thickness of the titanium layer, were readily obtained without loss of the other required properties of the glazing.

EXAMPLE III

A sheet of glass also destined for use as a heatable window for a vehicle was treated in the same sputtering chamber in which five planar magnetron sputtering sources, having targets of respectively tin, zinc, titanium, 316 stainless steel and silver were located.

The pressure in the chamber was reduced to 0.15 Pa. The panel was transported past the sputtering sources with the tin and zinc sources activated and cold sputtered by oxygen gas at an effective depositing pressure of 0.2 Pa to give a tin oxide layer followed by a zinc oxide layer on the substrate. The oxygen was then evacuated and the substrate moved back past the sputtering sources with the silver and stainless steel sources activated but this time with argon as the sputtering gas, to add a silver layer and a stainless steel layer, and then the tin and titanium sources were activated, with oxygen as the sputtering gas, to give further layers of tin oxide and titanium dioxide.

The resulting coating was formed by depositing layers of the following thickness and composition, from the glazing surface:

Undercoat
　15 nm tin oxide ($SnO_2$)
　14 nm zinc oxide
Reflective layer
　12 nm silver
Overcoat
　10 nm stainless steel for conversion to oxide
　14 nm tin oxide
　10 nm titanium dioxide.

The sacrificial layer of stainless steel became oxidised when the coated glazing was subjected to a bending treatment after which the cooling schedule of the glazing was controlled so that it became thermally tempered, for service as a window for a motor vehicle. The silver layer had a resistivity of approximately 4 ohms per square. The silver layer was substantially unaffected by the bending and tempering treatment due to the increased thickness of the sacrificial metal layer as compared with the glazing of Example 1. The unoxidised sacrificial metal layer also served to protect the silver layer during storage and transport prior to the bending and tempering treatment.

Values of the thicknesses of the various coating layers as set out in this specification are values measured by an ellipsometric method as described by K. L. Chopra in "Thin Film Phenomena" (McGraw-Hill) using an AUTOEL II ™ ellipsometer manufactured by Rudolph Research of Flanders, N.J. This apparatus uses a He-Ne laser source (lambda=632.8 nm) and measurements are taken in reflection with an angle of incidence of 70°.

What is claimed is:

1. An article, comprising:
   a glazing material coated with a multi-layer coating comprised of a reflective layer of silver sandwiched between a transparent undercoat and a transparent overcoat,
   wherein said transparent undercoat is provided on said glazing material and comprises at least one layer of at least one metal oxide selected from the group consisting of tin oxide, titanium dioxide, aluminium oxide, bismuth oxide, and mixtures thereof, over which is deposited a layer of zinc oxide having a thickness not greater than 15 nm, said layer of zinc oxide being in direct contact with said reflective layer of silver, and
   wherein said transparent overcoat comprises a layer of an oxide of at least one sacrificial metal selected from the group consisting of titanium, aluminium, stainless steal, bismuth, tin, and mixtures thereof, formed by initial deposition of said at least one sacrificial metal and conversion of said initial deposition of said at least one sacrificial metal to said oxide.

2. The article recited in claim 1, wherein said glazing material is transparent.

3. The article recited in claim 1, wherein said transparent overcoat includes at least one further layer of at least one metal oxide selected from the group consisting of tin oxide, titanium dioxide, aluminium oxide, bismuth oxide, and mixtures thereof, said at least one further layer being deposited after said layer of an oxide of at least one sacrificial metal is deposited.

4. The article recited in claim 1, wherein the article has one face including a peripheral margin and a remainder area, and wherein a strip of adhesive is positioned around the peripheral margin of said one face and said multi-layer coating is provided on said remainder area of said one face.

5. The article recited in claim 1, wherein said layer of silver has a thickness ranging from 24 to 28 nm.

6. The article recited in claim 1, wherein said transparent undercoat and said transparent overcoat each have a total thickness ranging from 30 to 45 nm.

7. The article recited in claim 1 wherein said at least one sacrificial metal is titanium.

8. The article recited in claim 7, wherein said transparent undercoat comprises a first layer of titanium dioxide overcoated by a first layer of tin oxide in turn overcoated by said layer of zinc oxide having a thickness not greater than 15 nm, and wherein said transparent overcoat comprises a layer of titanium dioxide formed by initial deposition of titanium metal and conversion thereof to said oxide, a further layer of tin oxide, and a further layer of titanium dioxide.

9. The article recited in claim 8, wherein said first layer of tin oxide and said further layer of tin oxide each have a thickness ranging from 15 to 25 nm, and wherein said first layer of titanium dioxide and said layer of titanium dioxide have a thickness ranging from 2 to 14 nm.

10. The article recited in claim 1, wherein said layer of zinc oxide has a thickness ranging from 5 to 13 nm.

11. The article recited in claim 10, wherein said layer of zinc oxide has a thickness ranging from 10 to 13 nm.

12. The article recited in claim 1, wherein said layer of silver has a thickness ranging from 1 to 12 nm.

13. The article recited in claim 12, having an emissivity of less the 0.1 at its coated face.

14. The article recited in claim 1, wherein said initial deposition of said at least one sacrificial metal is to a thickness ranging from 2 to 15 nm.

15. The article recited in claim 14, wherein said initial deposition of said at least one sacrificial metal is to a thickness ranging from 2 to 4 nm.

* * * * *